Aug. 23, 1932.  E. PERLMAN  1,872,802
FILTERING DEVICE
Filed Dec. 10, 1930
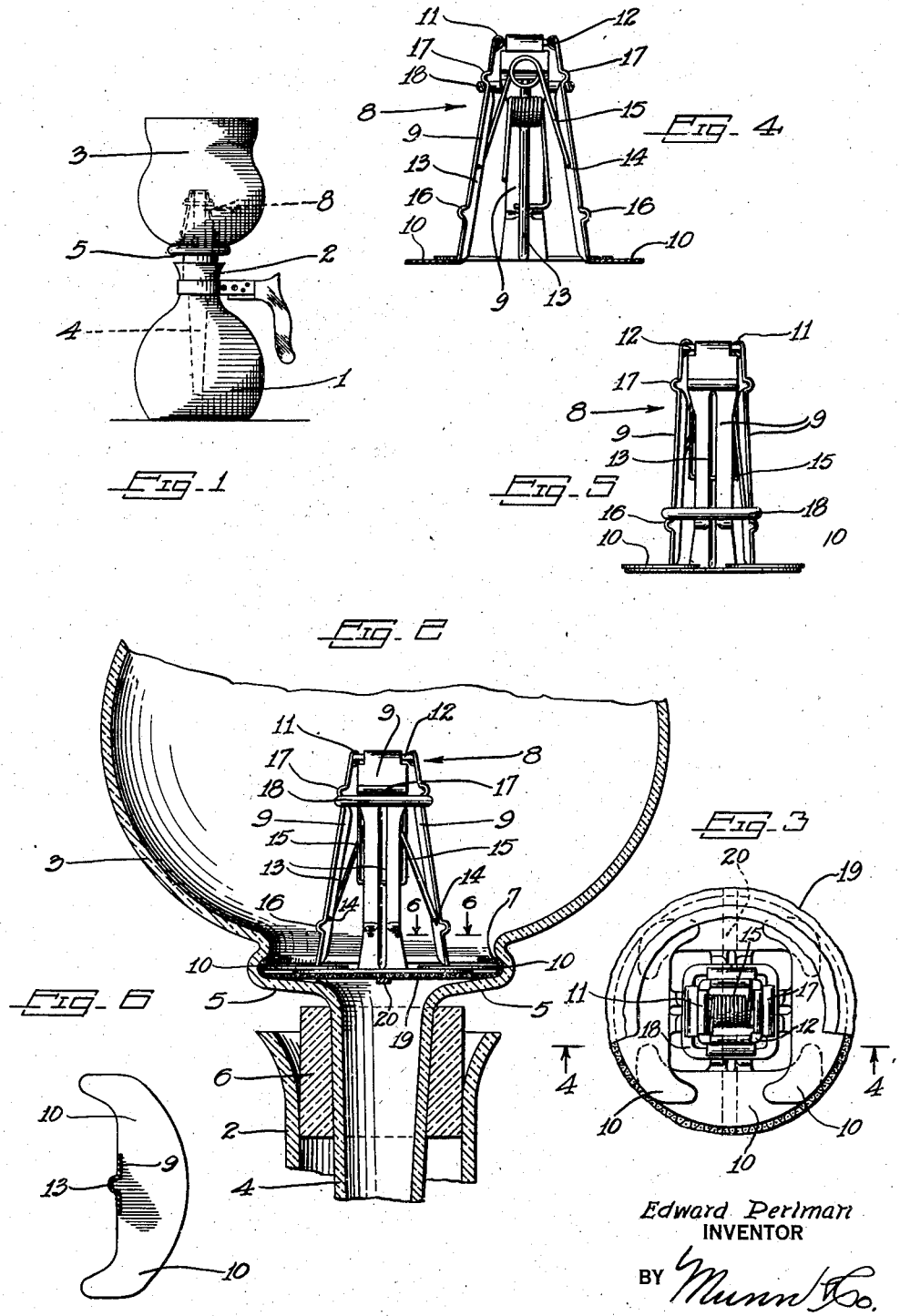
Edward Perlman
INVENTOR Patented Aug. 23, 1932

1,872,802

UNITED STATES PATENT OFFICE

EDWARD PERLMAN, OF CHICAGO, ILLINOIS

FILTERING DEVICE

Application filed December 10, 1930. Serial No. 501,391.

My invention relates to improvements in filtering devices, and it consists in the combinations, constructions, and arrangements herein described and claimed.

An object of my invention is to provide a filtering device in which certain improvements are embodied over the structure disclosed in my copending application, Serial No. 463,744. The structure in the copending application disclosed a novel strainer in which the means for providing the necessary tautness in the filtering element comprised a spring wire loop having its ends formed whereby the loop may be contracted or expanded. The present invention embodies structure for performing a similar function but a structure in which the means for providing tautness in the filtering element is rigid in its nature, whereby the filtering element may be firmly supported and at the same time providing a device which is easy and convenient to handle.

A further object is to provide a filtering device comprising a straining element operatively associated with an adjustable support having means whereby the straining element may be held between its support and an abutting surface, and in which the adjustable support is constructed in such a manner that an advantageous grip element is provided.

A further object is to provide a supporting device in which the supporting flange comprises a plurality of flanges arranged to define a circular contour and a rigid means for bearing against a strainer positioned between the flange and a resisting surface.

A further object is the provision of a filtering element of a type arranged to be associated with a coffee-making urn, and in which the filtering element is designed whereby the same may be easily and quickly positioned within a space of relatively small dimensions.

The invention also has for one of its objects the provision of a filtering device for use in connection with a non-metallic coffee-making urn, and in which the construction is such that maximum draining properties are attained, and in which a minimum amount of metal is exposed to the coffee.

Other objects and advantages will appear in the following specification, and the novel features of the invention will be particularly pointed out in the appended claims.

My invention is illustrated in the accompanying drawing, forming part of this application, in which Figure 1 is a side elevation of a coffee-making urn embodying my invention, Figure 2 is an enlarged sectional view showing my filtering device in an operable condition, Figure 3 is a top plan view, partly in section, of the filtering device per se, Figure 4 is a sectional view taken along the line 4—4 of Figure 3, Figure 5 is a side elevation showing the device in its contracted position, and Figure 6 is a sectional view taken along the line 6—6 of Figure 2.

In carrying out my invention, I make use of a container 1 which, in a sense, simulates a flask. The container is preferably formed from material such as glass, and is reduced at its upper end to provide a neck portion 2. A bowl (or second container) 3 is employed. The bowl is provided with a tubular extension 4, see Figures 1 and 2, which is arranged to be positioned within the container 1 and to extend to a point relatively close to the bottom of the latter. The tubular extension is preferably slightly tapered and merges with an enlarged portion 5 which connects the tubular portion and the bowl.

When the bowl is aranged in operative relation with container 1, the tubular extension is positioned within a seal 6, see Figure 2, which is preferably formed from flexible or compressible material, such as rubber or the like. When the bowl and the container are connected together, as shown in Figure 2, the interior of the container is of course sealed from the atmosphere.

In referring to Figure 2, it will be noted that the enlarged portion 5 is formed for providing a recess 7 within which a filtering device 8 may be positioned. This device comprises a plurality of arms 9 having integral flanges 10 which are formed upon their peripheral edges to substantially conform to the contour of the recess 7 when the device is positioned as shown in Figure 2. The arms are bent as at 11 for connection with a substantially rectangular ring 12 to which the arms are hingedly connected. The arms are preferably stamped from sheet metal and are provided with stamped ribs 13 having openings 14 for receiving the ends of spring members 15. The springs tend to move the arms away from one another, which of course expands the diameter of the flanges 10 in proportion to the distance the arms are moved.

The arms are formed as at 16 and 17 to form abutments between which a ring 18 may be moved. When the ring is positioned as shown in Figure 4, the device is expanded its maximum amount. This condition is shown in Figure 4. Figure 5 shows the ring shifted from its outer position to its inner position, at which time the arms are held in close relation, which of course contracts the flanges 10.

The flanges 10 support a filtering cloth or element 19. This element is arranged to be positioned in a straining or filtering condition, such as that shown in Figure 2. The cloth is of a size and form around its edge to provide a construction which permits its being operatively connected with the flanges 10 in such a manner that its associated structure may be expanded or contracted while the cloth is associated therewith. One side of the cloth is provided with a strip of material 20 which may be made from any suitable material having properties which permit a liquid to strain or flow therethrough. The strip 20 extends entirely across the cloth 19, whereby the ends of the strip will of course rest upon the inner surface of the enlarged portion 5 for holding the cloth in spaced relation with this portion so that a maximum draining or straining capacity is attained.

In operation, the straining element 8 is positioned as shown in Figure 2 and a given amount of coffee is thrown into the bowl 3. The coffee will of course fall upon and around the straining device and particularly upon the cloth 19. The container 1 is filled with a definite amount of water and the container and the bowl are operatively connected as shown in Figure 2. The container 1 is placed upon any suitable heating device with the result that in a short time practically the entire amount of water will pass into the bowl 3 through the medium of the tubular extension 4. When heat is applied to the container 1, the air in the chamber above the water is heated, which results in an expansion of the air.

Such expansion causes the water to move from the container 1 upwardly into the bowl 3 through the tubular extension 4. The water which passes to the bowl 3 mixes with the coffee therein with the result that a coffee brew of high quality is made. The liquid in the bowl 3 drains back to the container 1 as soon as the latter is removed from the source of heat. The liquid returns to the container 1 by reason of the vacuum created therein due to the cooling process which ensues as soon as the container is removed from its source of heat.

The straining device 8 is constructed in such a manner that a minimum amount of metal contacts with the liquid coffee. The arms 9 are arranged in such a manner that they are grouped in close relation about the longitudinal axis of the tubular extension 4. By reason of this fact, the arms, in addition to forming an essential part in connection with the flanges 10, provide means whereby the straining device may be easily handled by grasping the arms. The arms may be easily grasped by reason of the fact that they are centrally positioned with respect to the bowl 3 and also by reason of the fact that they extend above the coffee grounds. The device is relatively simple and easy to clean. The coffee grounds may be removed from the straining device by merely placing the latter under a running stream of water. The container 1 and the bowl 3 are preferably formed from material such as glass, whereby a nonmetallic coffee-making urn is utilized, which enhances the quality of the liquid coffee.

In referring to Figure 2, it will be noted that the straining device is firmly supported in its operative relation with the bowl 3 when the flanges are positioned within the groove or recess 7. The device is easily removed by simply pressing down upon the ring 18, which naturally contracts the diameter of the flange construction proper. The ring is pushed down until it abuts against the lugs or abutment 16, at which time the device may be lifted out of the bowl.

I claim:

1. A filtering device comprising a ring, a plurality of members hingedly connected to said ring, means for yieldingly moving the members to expanding positions, and a filtering element operatively connected with said members.

2. A filtering device comprising a ring, a plurality of members hingedly connected to said ring, means for yieldingly moving the members to expanding positions, a filtering element operatively connected with said members, and spring means for moving the members to their expanded positions.

3. A filtering device comprising a rectangular ring, a plurality of members hingedly connected at their upper ends to said ring, means for yieldingly moving the members to expanding positions, and a filtering element operatively connected with said members, said members being provided with flanges for connection with said filtering element.

4. A filtering device comprising a rectangular ring, a plurality of members hingedly connected at their upper ends to said ring, means for yieldingly moving the members to expanding positions, and a filtering element operatively connected with said members, said members being provided with flanges for connection with said filtering element, said flanges being adapted for holding the filtering element between the flanges and a supporting surface.

5. A filtering device comprising a rectangular ring, a plurality of members hingedly connected at their upper ends to said ring, means for yieldingly moving the members to expanding positions, and a filtering element operatively connected with said members, said members being provided with flanges for connection with said filtering element, said flanges being adapted for holding the filtering element between the flanges and a supporting surface, said members being grouped to provide a gripping ring.

6. A filtering device comprising a rectangular ring, a plurality of members hingedly connected at their upper ends to said ring, means for yieldingly moving the members to expanding positions, a filtering element operatively connected with said members, said members being provided with flanges for connection with said filtering element, said flanges being adapted for holding the filtering element between the flanges and a supporting surface, said members being grouped to provide a gripping ring, and means for holding the members in different positions.

7. The combination of a receptacle, a bowl operatively associated therewith and having an extended portion positioned within the receptacle, said bowl being provided with a groove, and a filtering device operatively positioned within the groove for filtering liquid in the bowl into said extended portion, said filtering device comprising a ring, a plurality of hinged members pivotally connected to said ring, spring means for yieldingly moving the members to the expanded positions, and a filtering element adapted to be held by said members in said groove.

8. The combination of a bowl having an annular grooved abutting surface in operative relation with an outlet, and a filtering device arranged to be positioned within the bowl and engage with said abutting surface, whereby the filtering device will be frictionally held therein, said filtering device comprising a ring, a plurality of hinged members pivotally connected to said ring, spring means for yieldingly moving the members to the expanded position, and a filtering element adapted to be held by said members in said groove.

EDWARD PERLMAN.